_United States Patent_ [19]

Ebato et al.

[11] Patent Number: 5,085,944
[45] Date of Patent: Feb. 4, 1992

[54] RARE EARTH METAL-SERIES ALLOYS FOR STORAGE OF HYDROGEN

[75] Inventors: Kazuo Ebato; Keiji Tamura, both of Tokyo, Japan

[73] Assignee: Nippon Yakin Kogyo Co., Ltd., Tokyo, Japan

[21] Appl. No.: 558,660

[22] Filed: Jul. 27, 1990

[30] Foreign Application Priority Data

Aug. 25, 1989 [JP] Japan ................................. 1-217544

[51] Int. Cl.$^5$ ..................... C22C 19/03; C22C 28/00; C01B 6/24
[52] U.S. Cl. .................... 428/570; 420/416; 420/455; 420/900; 423/644
[58] Field of Search ............ 420/416, 455, 900, 580, 420/587; 428/579; 423/644

[56] References Cited

U.S. PATENT DOCUMENTS 4,152,145  5/1979  Sandrock ........................ 420/900
4,222,770  9/1980  Osumi et al. .................... 420/900
4,347,082  8/1982  Osumi et al. .................... 420/900
4,378,331  3/1983  Bruning et al. ................. 420/900

FOREIGN PATENT DOCUMENTS 57-019347  2/1982  Japan .
57-063670  4/1982  Japan .
58-001032  1/1983  Japan .

Primary Examiner—R. Dean
Assistant Examiner—Margerg S. Phipps
Attorney, Agent, or Firm—Dvorak and Traub

[57] ABSTRACT

A rare-earth metal series alloy for storage of hydrogen is represented by a general formula of $Rem_1Ni_wAl_xFe_yM_z$ as an atomic ratio (wherein Rem is at least one rare earth element such as Mischmetal, M is at least one of Cu, Nb, Si and Zr, and $2.5 < w < 5.5$, $0 < x < 2.0$, $0 < y < 2.0$, $0 < z < 2.0$ and $4.0 \leq w+x+y+z \leq 6.0$). Further, the alloy is coated with a film of at least one of Pd, Cu and Ni having a thickness of 100–1000 Å.

5 Claims, 1 Drawing Sheet

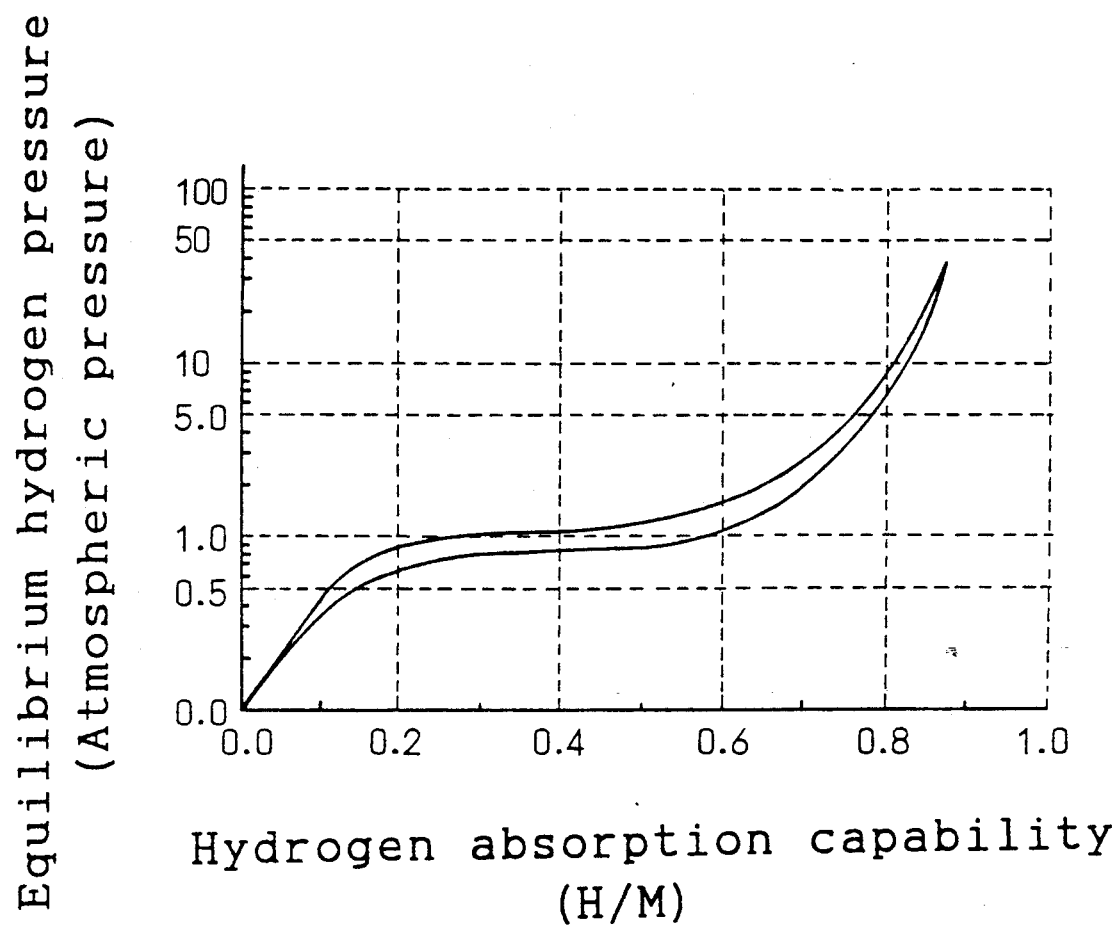

RARE EARTH METAL-SERIES ALLOYS FOR STORAGE OF HYDROGEN

BACKGROUND OF THE INVENTION

1. Field of the Invention

This invention relates to a rare earth metal-series alloy for storage of hydrogen capable of forming a metal hydride at a temperature of $-20°$ C.$-+80°$ C. under a hydrogen pressure of 0.1-10 atm to efficiently absorb and release a large amount of hydrogen and having an improved resistance to poisoning through impurity gas, and more particularly to a rare earth metal-series hydrogen absorption alloy suitable for use in a heat pump, a hydrogen getter, a negative member of hydrogen storage battery, a hydrogen storage member and the like.

2. Related Art Statement

Hydrogen is an element rich in natural source and produces only water even through burning, so that the balance in ecology is not collapsed and the storage and transportation are easy. For this end, hydrogen is considered to mainly take a secondary energy in a promising clean energy system.

However, hydrogen is a gas at room temperature and is very low in the liquefying temperature, so that it is urgently demanded to develop a technique of effectively storing hydrogen.

As a technique responding to the above demand, there is noticed a system of storing hydrogen in form of a metal hydride. According to this system, hydrogen can be stored in the same weight as in commercially available hydrogen cylinder of 150 atmospheric pressure at a volume corresponding to not more than 0.2 times of the volume of the above cylinder, and also the safety and the handling are very excellent.

The material suitable for absorbing hydrogen in form of a metal hydride and releasing it, if necessary, as mentioned above is a hydrogen absorption alloy. It is strongly attempted to develop application systems over a wide range, i.e. it is attempted to conduct the development of heat regeneration system or heat pump by utilizing the generation or absorption of reaction heat accompanied with the formation or decomposition reaction of metal hydride in such absorption and release of hydrogen, or the development of metal oxide-hydrogen storage battery utilizing electrochemical reaction as a battery negative pole.

As the properties required for such a hydrogen absorption alloy, there are mentioned the followings:

(1) it is cheap and rich as resource;
(2) it has a large hydrogen absorption capability;
(3) it has a suitable hydrogen absorption and dissociation equilibrium at service temperature region and is less in the hysteresis indicating a difference between absorption pressure and dissociation pressure;
(4) the hydrogen absorption and release reactions are reversible and the rate thereof is large; and the like.

There have hitherto been known MmNi$_5$ (Mm is a Mischmetal), TiFe and the like as a typical hydrogen absorption alloy.

However, MmNi$_5$ is required not only to take a high hydrogen pressure of 80-90 atmospheric pressure or a long treating time in the activation or initial hydrogenation but also to repeatedly conduct the above activation treatment, and has a drawback that the absorption and release of hydrogen take a long time. In order to solve such a problem, Mischmetal-nickel quaternary alloy (e.g. MmNi$_{5-x}$Al$_{x-y}$Fe$_y$, wherein x is 0.1-2, and y is 0.01-1.99) has been proposed in Japanese Patent Application Publication No. 58-39217 and No. 59-28626.

On the other hand, TiFe has a drawback that when water, $O_2$, CO, $CO_2$ or the like incorporates into hydrogen, the alloy surface is poisoned with these impurities to largely lower the hydrogen absorption capability. As a solution on this problem, a technique of coating the surface of the hydrogen absorption alloy with a different metal through plating has been proposed in Japanese Patent laid open No. 58-1032. According to this technique, the surface of TiFe alloy hardly activated is coated with a metal such as Ni, Cu, Co or the like as an oxide relatively easily reduced in a hydrogen atmosphere through plating. Though it is required to repeatedly conduct the vacuum discharge treatment at a high temperature of 450°-500° C. and the pressurizing treatment (room temperature) through high pressure hydrogen gas under 30-60 atmospheric pressure for about 1 week as the conventional activation operation, the above technique reduces the treating temperature to not higher than 200° C., the hydrogen pressure to 20-30 atmospheric pressure, and the treating time to not more than 1 day, respectively.

In the alloys described in Japanese Patent Application Publication No. 58-39217 and No. 59-28626 (e.g. MmNi$_{3.7}$Al$_{0.5}$Fe$_{0.8}$), however, the equilibrium hydrogen absorption.dissociation pressure at room temperature is about 1 atmospheric pressure, the range progressing the hydrogen absorption, or a plateau on hydrogen pressure-hydrogen composition curve (temperature is constant) is flat and the hysteresis is small, but the hydrogen absorption quantity is undesirably small.

In the alloy obtained by the method of Japanese Patent laid open No. 58-1032, the activation is improved, but it can not be said that this alloy provides the sufficient properties as a hydrogen absorption alloy.

In all of the above conventional alloys, the resistance to poisoning through impurity gas is not said to be sufficient, and the decrease of hydrogen absorption capability with lapse of time is unavoidable.

SUMMARY OF THE INVENTION

The invention advantageously solves the aforementioned problems and is to provide novel hydrogen absorption alloys in which the equilibrium hydrogen absorption pressure.dissociation pressure at room temperature is approximately 1 atmospheric pressure and the plateau is flat and the hysteresis is small and the hydrogen absorption capability is large and the resistance to poisoning through impurity gas such as moisture, oxygen or the like is excellent.

The inventors have made studies for achieving the above object and found that the large increase of hydrogen absorption ability and the effective reduction of hysteresis can be attained by substituting (a part of Ni or Fe in the above MmNi$_{5-x}$Al$_{x-y}$Fe$_y$) at least with one of Cu, Si, Zr, and Nb, and/or varying the composition ratio of rare earth elements in Mm, and also the resistance to poisoning through impurity gas can considerably be improved by coating the surface of such alloy powder at least with one of Pd, Cu and Ni.

For example, in the conventionally known MmNi$_{3.7}$Al$_{0.5}$Fe$_{0.8}$ alloy, the hydrogen absorption capability at a temperature of 40° C. and a hydrogen pressure of 5 atmospheric pressure is 0.59 as an atomic ratio of hydrogen/alloy (H/M), and the absorption pressure and dissociation pressure of the plateau are 1.00 atmospheric pressure and 0.64 atmospheric pressure, respectively, and the hysteresis is 0.36 atmospheric pressure. On the contrary, in $MmNi_{3.7}Al_{0.5}Fe_{0.6}Cu_{0.2}$ alloy obtained by substituting a part of Fe with Cu, the hydrogen absorption capability under the same conditions is 0.77, and the absorption pressure and dissociation pressure of the plateau are 1.10 atmospheric pressure and 0.84 atmospheric pressure, respectively, and the hysteresis is 0.26 atmospheric pressure. That is, when the latter alloy is compared with the former known alloy, the hydrogen absorption capability is increased by 31% and the hysteresis is reduced by 28%.

On the other hand, in the conventional material obtained by plating the surface of TiFe with Pd, when using hydrogen containing a water content of 1000 ppm, the hydrogen absorption quantity H/M at a temperature of 40° C. and a hydrogen pressure of 30 atmospheric pressure is 0.36, which reduces by 46% from the H/M value=0.66 of the alloy itself at 40° C. and 30 atmospheric pressure, while the hydrogen absorption pressure and dissociation pressure of the plateau are as high as about 15 atmospheric pressure and about 7 atmospheric pressure, respectively, and also the hysteresis is as very high as about 8 atmospheric pressure. When the hysteresis is high as mentioned above, in order to absorb and release hydrogen, the hydrogen absorption alloy or its metal hydride should be heated and cooled under a large temperature difference or the hydrogen pressure should be increased and decreased under a large pressure difference, so that the effective utilization of hydrogen storage ability, hydrogenation reaction heat, electrochemical energy is hardly expected.

In this connection, when a thin film of Pd is formed on the surface of the above $MmNi_{3.7}Al_{0.5}Fe_{0.6}Cu_{0.2}$ alloy powder, even if hydrogen containing a water content of 1000 ppm is used, hydrogen of H/M=0.68 can be absorbed under conditions of temperature of 40° C. and hydrogen pressure of 5 atmospheric pressure, and also the hydrogen absorption pressure and dissociation pressure of the plateau are 1.23 atmospheric pressure and 0.95 atmospheric pressure, respectively and the hysteresis is 0.28 atmospheric pressure, so that not only the hydrogen absorption quantity and hysteresis but also the resistance to poisoning through impurity gas are considerably improved.

That is, the invention lies in a rare-earth metal series alloy for storage of hydrogen, the alloy having a composition represented by the following general formula as an atomic ratio:

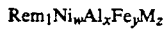

$Rem_1Ni_wAl_xFe_yM_z$ (wherein Rem is at least one of rare earth elements, M is at least one of Cu, Nb, Si and Zr, $2.5 < w < 5.5$, $0 < x < 2.0$, $0 < y < 2.0$, $0 < z < 2.0$, $4.0 \leq w+x+y+z \leq 6.0$).

In a preferred embodiment of the invention, the surface of the alloy powder represented by the above general formula is coated with a thin film of at least one metal selected from Pd, Cu and Ni.

Moreover, a Mischmetal is used as Rem. The Mischmetal has a composition of cerium: 40-52 wt % (hereinafter shown by % simply), lanthanum: 25-35%, praseodymium: 1-15%, neodium: 4-17%, samarium+gadolinium: 1-7%, iron: 0.1-5%, silicon: 0.1-1%, magnesium: 0.1-2% and aluminum: 0.1-1%.

The thin film is preferable to have a thickness of 100-1000 Å.

BRIEF DESCRIPTION OF THE DRAWING

The invention will be described with reference to the accompanying drawing, wherein:

FIG. 1 is a graph showing a relation between hydrogen absorption capability (H/M) and equilibrium hydrogen pressure.

DESCRIPTION OF THE PREFERRED EMBODIMENTS

According to the invention, the reason why the composition of the alloy is limited to the range represented by the aforementioned general formula will be described below.

Firstly, anyone of lanthanide series rare earth elements may be used as Rem, but the aforementioned Mischmetal is preferably used in actual use.

$Ni_w$: $2.5 < w < 5.5$

Ni has such a catalytic effect that it makes the hydride of Rem unstable to render the equilibrium pressure hydrogen into about 1 atmospheric pressure, and dissociates hydrogen molecule to its atom on the alloy surface during the absorption of hydrogen and also improves the resistance to poisoning of the alloy through oxygen. When the atomic ratio w of Rem is more than 5.5, alloys similar to $MmNi_5$ or $LaNi_5$ as a intermetallic compound or an alloy containing a stoichiometrically excessive amount of Ni are formed and hence the hydrogen absorption and release quantity are lessoned and the addition effect of Al, Fe, M (symbol) as mentioned below is not reflected on the properties of the alloy, and consequently the equilibrium pressure on hydrogen departs largely from the pressure application characteristic and the activation is difficult. On the other hand, when w is less than 2.5, the hydride becomes too stable and the release of hydrogen absorbed is difficult, so that it is undesirably required to conduct high temperature heating or in a combination with pressure reduction.

$Al_x$: $0 < x < 2.0$

Al is an element useful for holding the hydrogen absorption pressure and dissociation pressure at proper values and reducing the hysteresis. When x is more than 2.0, the hydrogen absorption pressure and dissociation pressure extremely reduce and also the hydrogen absorption quantity is decreased.

$Fe_y$: $0 < y < 2.0$

Fe is an element for holding the hydrogen absorption pressure and dissociation pressure at proper values and effectively contributes to reduce the hysteresis. When y is more than 2.0, the hydrogen absorption quantity is decreased and also the release of hydrogen absorbed is difficult and is undesirably required to conduct high temperature heating.

$M_z$: $0 < z < 2.0$

All of Cu, Nb, Si and Zr represented by symbol M are elements useful for increasing the hydrogen absorption quantity and decreasing the hysteresis. When z is more than 2.0, the hydrogen absorption pressure and dissociation pressure become too high and the hydrogen absorption quantity is decreased.

Although the above is described on the main elements and the preferable atomic ratio thereof, the alloy according to the invention is not sufficient to satisfy only the above requirements and is important to further restrict the sum of w, x, y, and z to a range of 4.0-6.0. In case of $4.0 \leq w+x+y+z \leq 6.0$, the alloy according to the invention can form a pseudo-binary intermetallic compound having a substantially CaCu$_5$ hexagonal structure to maintain the fundamental hydrogen absorption property, but when the value is outside the above range, this property can not be maintained and the hydrogen absorption quantity and release quantity are reduced.

Finally, the reason why Pd, Cu and Ni are used as a metal coating the surface of the above alloy is based on the fact that the thin film of each of these elements is easy to selectively permeate hydrogen.

Although it is not clearly elucidated that these metals mitigates the poisoning of the alloy to moisture, oxygen or the like to make the hysteresis small, it is considered that these metals dissociate only hydrogen molecule to an atomic state to penetrate into the inside of the alloy and hence the hydrogen atom is effectively absorbed in the matrix of the alloy.

Moreover, the coating thickness of the metal is preferable to be about 100–1000 Å.

The production of the alloy according to the invention will be described below.

In the production of the alloy according to the invention, it is enough to utilize the conventionally known method of producing hydrogen absorption alloy. Particularly, an arc melting method is preferable as a melting method. Therefore, the invention will be described with respect to the production method using the arc melting method below.

At first, the metal components satisfying amounts shown by the above general formula are weighed and mixed with each other, which is pressed into an optional shape. This shaped body is placed in an arc melting furnace and melted by heating in an inert gas atmosphere, which is solidified in the furnace, cooled to room temperature and then taken out therefrom. The resulting alloy is placed in a vacuum vessel and held therein at 900°–1000° C. under a vacuum of not more than $10^{-2}$ Torr for more than 8 hours to homogenize the alloy, which is taken out from the vessel and cooled in air, or the vessel is introduced into water for cooling. Thereafter, the alloy is pulverized into a grain size of about 100 μm.

On the other hand, electroless plating method and vacuum deposition method are preferable as a method for coating the surface of the alloy powder with a thin film of a metal such as Pd, Cu, Ni or the like.

Moreover, after the formation of such a metal thin film, the activation treatment for occluding hydrogen can be made under the same conditions as in the case of having no thin film without damaging the hydrogen absorption capability of the alloy itself. In this case, the hydrogen occluding speed is not lowered because the thin film has a large atomic gap enough to permeate hydrogen gas.

The effects aiming at the invention are as follows:
(1) The hydrogen absorption capability is larger than that of the conventional alloy;
(2) The difference between hydrogen absorption pressure and dissociation pressure of the hysteresis is small as compared with that of the conventional alloy, so that the hydrogen absorption capability, reaction heat and electrochemical energy can effectively be utilized;
(3) There is substantially no degradation of the alloy even when repeating the absorption and release of hydrogen containing impurities such as water, oxygen, carbon dioxide gas and the like;
(4) The activation is easy and also the absorption and release rates of hydrogen are equal to or more than those of the conventional alloy.

As mentioned above, the alloys according to the invention possess all properties required as a material for absorption and release of hydrogen. Particularly, the hydrogen absorption capability and hysteresis are considerably improved as compared with those of the conventional material for absorption and release of hydrogen. Furthermore, they have remarkable merits that the activation is easy and hydrogen containing impurities such as water, oxygen and the like can be absorbed at a high density as compared with the conventional material. Therefore, the invention develops considerably excellent effects in the various applications such as material for absorption and release of hydrogen, system for storage and purification of hydrogen, system for separation and recovery of hydrogen, cathode material in a storage battery, hydrogen getter material under a reduced pressure, heat pump utilizing reaction heat accompanied with hydrogen absorption and release reaction, and the like.

The following examples are given in illustration of the invention and are not intended as limitations thereof.

EXAMPLE 1

Various commercially available metals were weighed into proper amounts so as to have an atomic ratio composition shown in the following Table 1 and placed into a copper crucible of a vacuum arc melting furnace. After the inside of the furnace was rendered into an atmosphere of 99.99% argon, these metals were melted by heating to prepare about 40 g of button-like alloy ingot.

Then, each button-like sample was placed into a quartz tube and held in a heating furnace at 950° C. under a vacuum of $10^{-2}$ Torr for 8 hours, which was quenched by placing the quartz tube in water. Thus a normalizing heat treatment was conducted for the sample. Thereafter, each sample was pulverized to about 100 μm.

Next, each of the samples was weighed to 15 g and sealed in a stainless steel reaction vessel for hydrogen absorption and release. After the degassing was carried out by sucking an inside of such a sealed reaction vessel at a temperature of from room temperature to 150° C. under a vacuum, hydrogen having a purity of 99.9999% was introduced into the vessel and pressurized to 30 atmospheric pressure, whereby the hydrogen absorption reaction was immediately started at room temperature. After hydrogen was sufficiently absorbed, the sample was again sucked under vacuum.

The activation of the alloy could substantially completely be made by single hydrogen absorption and release.

When this sealed reaction vessel was immersed in a thermostatic chamber held at 40° C. and hydrogen having a purity of 99.9999was introduced thereinto and pressurized under 1–30 atmospheric pressure, the introduced hydrogen quantity and pressure change were measured to obtain a pressure-composition isotherm, from which the hydrogen absorption quantity, absorption pressure, dissociation pressure and hysteresis were measured to obtain results as shown in Table 1.

For the reference, the pressure-composition isotherm curve of the sample No. 2 at 40° C. is shown in FIG. 1.

TABLE 1

| Kind of alloy | Sample No. | Alloy composition (Atomic ratio) | Temperature (°C.) | Hydrogen absorption quantity 30 atmospheric pressure H/M | Hydrogen absorption quantity 30 atmospheric pressure A/B | Hydrogen absorption quantity 5 atmospheric pressure H/M | Hydrogen absorption quantity 5 atmospheric pressure A/B | Absorption pressure Pa | Dissociation pressure Pd | Hysteresis Pa—Pd | Hysteresis A/B |
|---|---|---|---|---|---|---|---|---|---|---|---|
| Invention alloy (A) | 1 | $Mm_1 Ni_{3.7} Al_{0.5} Fe_{0.7} Cu_{0.1}$ | 40 | 0.77 | 1.17 | 0.66 | 0.12 | 1.42 | 1.08 | 0.34 | 0.94 |
| | 2 | $Mm_1 Ni_{3.7} Al_{0.5} Fe_{0.6} Cu_{0.2}$ | 40 | 0.87 | 1.32 | 0.77 | 1.31 | 1.10 | 0.84 | 0.26 | 0.72 |
| | 3 | $Mm_1 Ni_{3.7} Al_{0.5} Fe_{0.55} Cu_{0.25}$ | 40 | 0.76 | 1.15 | 0.67 | 1.14 | 0.88 | 0.55 | 0.33 | 0.92 |
| | 4 | $Mm_1 Ni_{3.6} Al_{0.5} Fe_{0.7} Cu_{0.2}$ | 40 | 0.75 | 1.14 | 0.66 | 1.12 | 0.80 | 0.50 | 0.30 | 0.83 |
| | 5 | $Mm_1 Ni_{3.7} Al_{0.5} Fe_{0.7} Si_{0.1}$ | 40 | 0.69 | 1.05 | 0.62 | 1.05 | 0.56 | 0.36 | 0.20 | 0.56 |
| | 6 | $Mm_1 Ni_{3.7} Al_{0.5} Fe_{0.7} Zr_{0.1}$ | 40 | 0.70 | 1.06 | 0.62 | 1.05 | 0.66 | 0.53 | 0.13 | 0.36 |
| | 7 | $Mm_1 Ni_{3.7} Al_{0.5} Fe_{0.7} Nb_{0.1}$ | 40 | 0.77 | 1.17 | 0.68 | 1.15 | 0.67 | 0.45 | 0.22 | 0.61 |
| | 8 | $Mm_{0.9} La_{0.1} Ni_{3.7} Al_{0.5} Fe_{0.7} Cu_{0.1}$ | 40 | 0.78 | 1.18 | 0.66 | 1.12 | 0.69 | 0.46 | 0.23 | 0.64 |
| | 9 | $Mm_{0.85} La_{0.15} Ni_{3.7} Al_{0.5} Fe_{0.7} Cu_{0.1}$ | 40 | 0.75 | 1.14 | 0.66 | 1.12 | 0.62 | 0.40 | 0.22 | 0.61 |
| | 10 | $Mm_{0.75} La_{0.25} Ni_{3.7} Al_{0.5} Fe_{0.7} Cu_{0.1}$ | 40 | 0.72 | 1.09 | 0.63 | 1.07 | 0.87 | 0.69 | 0.18 | 0.50 |
| | 11 | $Mm_{0.7} La_{0.3} Ni_{3.7} Al_{0.5} Fe_{0.7} Cu_{0.1}$ | 40 | 0.75 | 1.14 | 0.67 | 1.14 | 0.51 | 0.38 | 0.13 | 0.36 |
| | 12 | $Mm_{0.55} La_{0.45} Ni_{3.7} Al_{0.5} Fe_{0.7} Cu_{0.1}$ | 40 | 0.75 | 1.14 | 0.67 | 1.14 | 0.60 | 0.39 | 0.21 | 0.58 |
| | 13 | $Mm_{0.4} La_{0.6} Ni_{3.7} Al_{0.5} Fe_{0.7} Cu_{0.1}$ | 40 | 0.73 | 1.11 | 0.66 | 1.12 | 0.72 | 0.57 | 0.15 | 0.42 |
| Conventional alloy (B) | 14 | $Mm_1 Ni_{3.7} Al_{0.5} Fe_{0.8}$ | 40 | 0.66 | — | 0.59 | — | 1.00 | 0.64 | 0.36 | — |

As seen from Table 1, the alloys according to the invention (No. 1-No. 13) have good results that the hydrogen absorption quantity is large by about 5-31% at a hydrogen pressure of 5 atmospheric pressure and the hysteresis is small by 6-64% as compared with those of the conventional alloy (No. 14).

As seen from FIG. 1, the alloy according to the invention is flat in the plateau and its equilibrium pressure between hydrogen absorption and dissociation is approximately 1 atmospheric pressure.

EXAMPLE 2

The same procedure as in Example 1 was repeated to prepare alloy powders (Sample Nos. 15-25) having an atomic ratio composition as shown in the following Table 2.

After the surface of each of these alloy powders was activated with hydrochloric acid, it was subjected to an electroless plating with a palladium salt to form a palladium thin film having a thickness of about 100-1000 Å on the powder surface, washed with water and further with alcohol and dried.

Thereafter, each of the coated alloy powders was subjected to the same activation treatment as in Example 1, whereby the activation could substantially completely be achieved at one hydrogen absorption and release.

Then, the sealed reaction vessel containing each of these samples was immersed in a thermostatic chamber held at 40° C., and hydrogen containing 1000 ppm of water was introduced into the vessel and pressurized under 1-30 atmospheric pressure, during which the hydrogen quantity introduced and the pressure change were measured to obtain a pressure-composition isotherm curve, from which the hydrogen absorption quantity, absorption pressure, dissociation pressure and hysteresis were determined to obtain results as shown in Table 2.

TABLE 2

| Kind of alloy | Sample No. | Metal coated by plating | Alloy composition (Atomic ratio) | Temperature (°C.) | Hydrogen absorption 30 atmospheric pressure H/M | Hydrogen absorption 30 atmospheric pressure A/B | Hydrogen absorption 5 atmospheric pressure H/M | Hydrogen absorption 5 atmospheric pressure A/B | Absorption pressure Pa | Dissociation pressure Pd | Hysteresis Pa—Pd | Hysteresis A/B |
|---|---|---|---|---|---|---|---|---|---|---|---|---|
| Invention alloy (A) | 15 | Pd | $Mm_1 Ni_{3.7} Al_{0.5} Fe_{0.7} Cu_{0.1}$ | 40 | 0.66 | 1.16 | 0.58 | 1.14 | 1.56 | 1.23 | 0.33 | 0.87 |
| | 16 | Pd | $Mm_1 Ni_{3.7} Al_{0.5} Fe_{0.6} Cu_{0.2}$ | 40 | 0.75 | 1.32 | 0.68 | 1.33 | 1.23 | 0.95 | 0.28 | 0.74 |
| | 17 | Pd | $Mm_1 Ni_{3.6} Al_{0.5} Fe_{0.7} Cu_{0.2}$ | 40 | 0.65 | 1.14 | 0.57 | 1.12 | 0.98 | 0.62 | 0.36 | 0.95 |
| | 18 | Pd | $Mm_1 Ni_{3.7} Al_{0.5} Fe_{0.7} Si_{0.1}$ | 40 | 0.64 | 1.12 | 0.57 | 1.12 | 0.67 | 0.43 | 0.24 | 0.63 |
| | 19 | Pd | $Mm_1 Ni_{3.7} Al_{0.5} Fe_{0.7} Zr_{0.1}$ | 40 | 0.61 | 1.07 | 0.54 | 1.06 | 0.79 | 0.61 | 0.18 | 0.47 |
| | 20 | Pd | $Mm_1 Ni_{3.7} Al_{0.5} Fe_{0.7} Nb_{0.1}$ | 40 | 0.60 | 1.05 | 0.53 | 1.04 | 0.85 | 0.62 | 0.23 | 0.60 |
| | 21 | Pd | $Mm_{0.85} La_{0.15} Ni_{3.7} Al_{0.5} Fe_{0.7} Cu_{0.1}$ | 40 | 0.65 | 1.14 | 0.57 | 1.12 | 0.81 | 0.53 | 0.28 | 0.74 |
| | 22 | Pd | $Mm_{0.7} La_{0.3} Ni_{3.7} Al_{0.5} Fe_{0.7} Cu_{0.1}$ | 40 | 0.70 | 1.23 | 0.62 | 1.22 | 0.64 | 0.50 | 0.14 | 0.37 |
| | 23 | Pd | $Mm_{0.4} La_{0.6} Ni_{3.7} Al_{0.5} Fe_{0.7} Cu_{0.1}$ | 40 | 0.64 | 1.12 | 0.55 | 1.08 | 0.83 | 0.67 | 0.16 | 0.42 |
| Conventional alloy | 24 | Pd | $Mm_1 Ni_{3.7} Al_{0.5} Fe_{0.8}$ (B) | 40 | 0.57 | — | 0.51 | — | 1.10 | 0.72 | 0.38 | — |
| | 25 | Pd | $Ti_1 Fe_1$ | 40 | 0.36 | | 0.02 | | 15.0 | 7.0 | 8.0 | |

As seen from Table 2, in the alloys according to the invention (Nos. 15-23), the hydrogen absorption quanity is large by 4-33% at a hydrogen pressure of 5 atmospheric pressure and the hysteresis is small by 5-63% as compared with the conventional alloy (No. 24).

EXAMPLE 3

The same procedure as in Example 1 was repeated to prepare alloy powders (Sample Nos. 26-36) having an atomic ratio composition as shown in the following Table 3.

Then, each of these alloy powders was subjected to a vapor deposition with palladium under a vacuum ($10^{-4}$ Torr). In this case, the vapor deposition was repeated 10 times while stirring the alloy powder every vapor deposition, whereby the thin film having a thickness of about 100-1000 Å was formed on the full surface of the alloy powder.

Thereafter, each of the coated alloy powders was subjected to the same activation treatment as in Example 1, whereby the activation could substantially completely be achieved at one hydrogen absorption and release.

Then, the sealed reaction vessel containing each of these samples was immersed in a thermostatic chamber held at 40° C., and hydrogen containing 1000 ppm of water, 1000 ppm of oxygen and 1% of carbon dioxide was introduced into the vessel and pressurized under 1-30 atmospheric pressure, during which the hydrogen quantity introduced and the pressure change were measured to obtain a pressure-composition isotherm curve, from which the hydrogen absorption quantity, absorption pressure, dissociation pressure and hysteresis were determined to obtain results as shown in Table 3.

spheric pressure and the hysteresis is small by 13-61% as compared with the conventional alloy (No. 35).

EXAMPLE 4

The same procedure as in Example 1 was repeated to prepare alloy powders (Sample Nos. 37-47) having an atomic ratio composition as shown in the following Table 4.

After the surface of each of these alloy powders was activated with hydrochloric acid, it was subjected to an electroless plating with copper chloride to form a copper thin film having a thickness of about 100-1000 Å on the powder surface, washed with water and further with alcohol and dried.

Thereafter, each of the coated alloy powders was subjected to the same activation treatment as in Example 1, whereby the activation could substantially completely be achieved at one hydrogen absorption and release.

Then, the sealed reaction vessel containing each of these samples was immersed in a thermostatic chamber held at 40° C., and hydrogen containing 1000 ppm of water was introduced into the vessel and pressurized under 1-30 atmospheric pressure, during which the hydrogen quantity introduced and the pressure change were measured to obtain a pressure-composition isotherm curve, from which the hydrogen absorption quantity, absorption pressure, dissociation pressure and hysteresis were determined to obtain results as shown in Table 4.

TABLE 3

| Kind of alloy | Sample No. | Metal coated by vapor deposition | Alloy composition (Atomic ratio) | Temperature (°C.) | Hydrogen absorption 30 atmospheric pressure | | 5 atmospheric pressure | | Absorption pressure Pa | Dissociation pressure Pd | Hysteresis Pa—Pd | A/B |
|---|---|---|---|---|---|---|---|---|---|---|---|---|
| | | | | | H/M | A/B | H/M | A/B | | | | |
| Invention alloy (A) | 26 | Pd | $Mm_1 Ni_{3.7} Al_{0.5} Fe_{0.7} Cu_{0.1}$ | 40 | 0.66 | 1.16 | 0.59 | 1.18 | 1.53 | 1.20 | 0.33 | 0.87 |
| | 27 | Pd | $Mm_1 Ni_{3.7} Al_{0.5} Fe_{0.6} Cu_{0.2}$ | 40 | 0.76 | 1.33 | 0.67 | 1.34 | 1.30 | 1.01 | 0.29 | 0.76 |
| | 28 | Pd | $Mm_1 Ni_{3.6} Al_{0.5} Fe_{0.7} Cu_{0.2}$ | 40 | 0.70 | 1.23 | 0.62 | 1.24 | 0.91 | 0.61 | 0.30 | 0.79 |
| | 29 | Pd | $Mm_1 Ni_{3.7} Al_{0.5} Fe_{0.7} Si_{0.1}$ | 40 | 0.60 | 1.05 | 0.53 | 1.06 | 0.78 | 0.50 | 0.28 | 0.74 |
| | 30 | Pd | $Mm_1 Ni_{3.7} Al_{0.5} Fe_{0.7} Zr_{0.1}$ | 40 | 0.58 | 1.02 | 0.50 | 1.00 | 0.79 | 0.64 | 0.15 | 0.39 |
| | 31 | Pd | $Mm_1 Ni_{3.7} Al_{0.5} Fe_{0.7} Nb_{0.1}$ | 40 | 0.63 | 1.11 | 0.57 | 1.14 | 0.83 | 0.56 | 0.27 | 0.71 |
| | 32 | Pd | $Mm_{0.85} La_{0.15} Ni_{3.7} Al_{0.5} Fe_{0.7} Cu_{0.1}$ | 40 | 0.65 | 1.14 | 0.57 | 1.14 | 0.80 | 0.56 | 0.24 | 0.63 |
| | 33 | Pd | $Mm_{0.7} La_{0.3} Ni_{3.7} Al_{0.5} Fe_{0.7} Cu_{0.1}$ | 40 | 0.66 | 1.16 | 0.59 | 1.18 | 0.76 | 0.59 | 0.17 | 0.45 |
| | 34 | Pd | $Mm_{0.4} La_{0.6} Ni_{3.7} Al_{0.5} Fe_{0.7} Cu_{0.1}$ | 40 | 0.64 | 1.12 | 0.57 | 1.14 | 0.88 | 0.66 | 0.22 | 0.58 |
| Conventional alloy | 35 | Pd | $Mm_1 Ni_{3.7} Al_{0.5} Fe_{0.8}$ (B) | 40 | 0.57 | — | 0.50 | — | 1.13 | 0.75 | 0.38 | — |
| | 36 | Pd | $Ti_1 Fe_1$ | 40 | 0.31 | | 0.02 | | 16.0 | 8.00 | 8.00 | |

As seen from Table 3, in the alloys according to the invention (Nos. 26-34), the hydrogen absorption quantity is large by 0-34% at a hydrogen pressure of 5 atmospheric pressure and the hysteresis is small by 13-61% as compared with the conventional alloy (No. 35).

TABLE 4

| Kind of alloy | Sample No. | Metal coated by plating | Alloy composition (Atomic ratio) | Temperature (°C.) | Hydrogen absorption 30 atmospheric pressure | | 5 atmospheric pressure | | Absorption pressure Pa | Dissociation pressure Pd | Hysteresis Pa—Pd | A/B |
|---|---|---|---|---|---|---|---|---|---|---|---|---|
| | | | | | H/M | A/B | H/M | A/B | | | | |
| Invention alloy (A) | 37 | Cu | $Mm_1 Ni_{3.7} Al_{0.5} Fe_{0.7} Cu_{0.1}$ | 40 | 0.66 | 1.20 | 0.58 | 1.21 | 1.64 | 1.27 | 0.37 | 0.92 |
| | 38 | Cu | $Mm_1 Ni_{3.7} Al_{0.5} Fe_{0.6} Cu_{0.2}$ | 40 | 0.76 | 1.38 | 0.67 | 1.40 | 1.35 | 0.98 | 0.37 | 0.92 |
| | 39 | Cu | $Mm_1 Ni_{3.6} Al_{0.5} Fe_{0.7} Cu_{0.2}$ | 40 | 0.64 | 1.16 | 0.57 | 1.19 | 0.94 | 0.62 | 0.32 | 0.80 |
| | 40 | Cu | $Mm_1 Ni_{3.7} Al_{0.5} Fe_{0.7} Si_{0.1}$ | 40 | 0.60 | 1.09 | 0.54 | 1.13 | 0.85 | 0.54 | 0.31 | 0.78 |
| | 41 | Cu | $Mm_1 Ni_{3.7} Al_{0.5} Fe_{0.7} Zr_{0.1}$ | 40 | 0.55 | 1.00 | 0.49 | 1.02 | 0.79 | 0.61 | 0.18 | 0.45 |
| | 42 | Cu | $Mm_1 Ni_{3.7} Al_{0.5} Fe_{0.7} Nb_{0.1}$ | 40 | 0.66 | 1.20 | 0.57 | 1.19 | 0.89 | 0.58 | 0.31 | 0.78 |
| | 43 | Cu | $Mm_{0.85} La_{0.15} Ni_{3.7} Al_{0.5} Fe_{0.7} Cu_{0.1}$ | 40 | 0.65 | 1.18 | 0.56 | 1.17 | 0.78 | 0.54 | 0.24 | 0.60 |
| | 44 | Cu | $Mm_{0.7} La_{0.3} Ni_{3.7} Al_{0.5} Fe_{0.7} Cu_{0.1}$ | 40 | 0.66 | 1.20 | 0.58 | 1.21 | 0.65 | 0.49 | 0.16 | 0.40 |
| | 45 | Cu | $Mm_{0.4} La_{0.6} Ni_{3.7} Al_{0.5} Fe_{0.7} Cu_{0.1}$ | 40 | 0.63 | 1.15 | 0.55 | 1.15 | 0.88 | 0.66 | 0.22 | 0.55 |
| Conventional | 46 | Cu | $Mm_1 Ni_{3.7} Al_{0.5} Fe_{0.8}$ (B) | 40 | 0.55 | — | 0.48 | — | 1.25 | 0.85 | 0.40 | — |
| | 47 | Cu | $Ti_1 Fe_1$ | 40 | 0.31 | | 0.02 | | 17.0 | 8.00 | 9.00 | |

TABLE 4-continued

| Kind of alloy | Sample No. | Metal coated by plating | Alloy composition (Atomic ratio) | Temperature (°C.) | Hydrogen absorption | | | | Absorption pressure Pa | Dissociation pressure Pd | Hysteresis | |
|---|---|---|---|---|---|---|---|---|---|---|---|---|
| | | | | | 30 atmospheric pressure | | 5 atmospheric pressure | | | | Pa—Pd | A/B |
| | | | | | H/M | A/B | H/M | A/B | | | | |

As seen from Table 4, in the alloys according to the invention (Nos. 37-45), the hydrogen absorption quantity is large by 2-40% at a hydrogen pressure of 5 atmospheric pressure and the hysteresis is small by 8-60% as compared with the conventional alloy (No. 46).

EXAMPLE 5

The same procedure as in Example 1 was repeated to prepare alloy powders (Sample Nos. 48-58) having an atomic ratio composition as shown in the following Table 5.

After the surface of each of these alloy powders was activated with hydrochloric acid, it was subjected to an electroless plating with nickel chloride to form a nickel thin film having a thickness of about 100-1000 Å on the powder surface, washed with water and further with alcohol and dried.

Thereafter, each of the coated alloy powders was subjected to the same activation treatment as in Example 1, whereby the activation could substantially completely be achieved at one hydrogen absorption and release.

Then, the hydrogen absorption quantity, absorption pressure, dissociation pressure and hysteresis were measured in the same manner as in Example 4 to obtain results as shown in Table 5.

As seen from Table 5, in the alloys according to the invention (Nos. 48-56), the hydrogen absorption quantity is large by 4-34% at a hydrogen pressure of 5 atmospheric pressure and the hysteresis is small by 2-59% as compared with the conventional alloy (No. 57).

What is claimed is:

1. A rare-earth metal series alloy for storage of hydrogen, the alloy having a composition represented by the following general formula as an atomic ratio:

$$Rem_1Ni_wAl_xFe_yM_z$$

(wherein Rem is at least one of rare earth elements, M is at least one of Cu, Nb, Si and Zr, $2.5 < w < 5.5$, $[0 < x < 2.0,\ 0 < y < 2.0,\ 0 < z < 2.0]$ $0.01 \leq x < 2.0$, $0.01 \leq y < 2.0$, $0.01 \leq z < 2.0$ and $4.0 \leq w + x + y + z \leq 6.0$).

2. The rare-earth metal series alloy according to claim 1, wherein surfaces of powdered alloy are coated with thin films of at least one metal selected from Pd, Cu and Ni.

3. The rare-earth metal series alloy according to claim 2, wherein said thin film has a thickness of 100-1000 Å.

4. The rare-earth metal series alloy according to claim 1, wherein a Mischmetal is used as Rem.

5. The rare-earth metal series alloy according to claim 4, wherein said Mischmetal has a composition of cerium: 40-52 wt %, lanthanum: 25-35 wt %, praseodymium: 1-15 wt %, neodium: 4-17 wt %, samarium+gadolinium: 1-7 wt %, iron: 0.1-5 wt %, silicon: 0.1-1 wt %, magnesium: 0.1-2 wt % and aluminum: 0.1-1 wt %.

TABLE 5

| Kind of alloy | Sample No. | Metal coated by plating | Alloy composition (Atomic ratio) | Temperature (°C.) | Hydrogen absorption | | | | Absorption pressure Pa | Dissociation pressure Pd | Hysteresis | |
|---|---|---|---|---|---|---|---|---|---|---|---|---|
| | | | | | 30 atmospheric pressure | | 5 atmospheric pressure | | | | Pa—Pd | A/B |
| | | | | | H/M | A/B | H/M | A/B | | | | |
| Invention alloy (A) | 48 | Ni | $Mm_1\ Ni_{3.7}\ Al_{0.5}\ Fe_{0.7}\ Cu_{0.1}$ | 40 | 0.66 | 1.18 | 0.58 | 1.16 | 1.58 | 1.21 | 0.37 | 0.84 |
| | 49 | Ni | $Mm_1\ Ni_{3.7}\ Al_{0.5}\ Fe_{0.6}\ Cu_{0.2}$ | 40 | 0.76 | 1.36 | 0.67 | 1.34 | 1.31 | 1.02 | 0.29 | 0.66 |
| | 50 | Ni | $Mm_1\ Ni_{3.6}\ Al_{0.5}\ Fe_{0.7}\ Cu_{0.2}$ | 40 | 0.59 | 1.05 | 0.53 | 1.06 | 1.12 | 0.69 | 0.43 | 0.98 |
| | 51 | Ni | $Mm_1\ Ni_{3.7}\ Al_{0.5}\ Fe_{0.7}\ Si_{0.1}$ | 40 | 0.60 | 1.07 | 0.53 | 1.06 | 0.83 | 0.55 | 0.28 | 0.64 |
| | 52 | Ni | $Mm_1\ Ni_{3.7}\ Al_{0.5}\ Fe_{0.7}\ Zr_{0.1}$ | 40 | 0.61 | 1.09 | 0.54 | 1.08 | 0.78 | 0.60 | 0.18 | 0.41 |
| | 53 | Ni | $Mm_1\ Ni_{3.7}\ Al_{0.5}\ Fe_{0.7}\ Nb_{0.1}$ | 40 | 0.60 | 1.07 | 0.54 | 1.08 | 0.98 | 0.65 | 0.33 | 0.75 |
| | 54 | Ni | $Mm_{0.85}\ La_{0.15}\ Ni_{3.7}\ Al_{0.5}\ Fe_{0.7}\ Cu_{0.1}$ | 40 | 0.59 | 1.05 | 0.52 | 1.04 | 0.90 | 0.60 | 0.30 | 0.68 |
| | 55 | Ni | $Mm_{0.7}\ La_{0.3}\ Ni_{3.7}\ Al_{0.5}\ Fe_{0.7}\ Cu_{0.1}$ | 40 | 0.65 | 1.16 | 0.56 | 1.12 | 0.78 | 0.60 | 0.18 | 0.41 |
| | 56 | Ni | $Mm_{0.4}\ La_{0.6}\ Ni_{3.7}\ Al_{0.5}\ Fe_{0.7}\ Cu_{0.1}$ | 40 | 0.64 | 1.14 | 0.56 | 1.12 | 0.87 | 0.65 | 0.22 | 0.50 |
| Conventional alloy | 57 | Ni | $Mm_1\ Ni_{3.7}\ Al_{0.5}\ Fe_{0.8}$ (B) | 40 | 0.56 | — | 0.50 | — | 1.24 | 0.80 | 0.44 | — |
| | 58 | Ni | $Ti_1\ Fe_1$ | 40 | 0.31 | | 0.02 | | 17.0 | 8.50 | 8.50 | |